US012515257B2

(12) United States Patent
Nifenecker et al.

(10) Patent No.: US 12,515,257 B2
(45) Date of Patent: Jan. 6, 2026

(54) CIRCULAR MODULAR TRAY FOR THE ADDITIVE MANUFACTURING OF A PART WITH AN AXIS OF REVOLUTION ON A POWDER BED

(71) Applicants: SAFRAN HELICOPTER ENGINES, Bordes (FR); SAFRAN TRANSMISSION SYSTEMS, Colombes (FR)

(72) Inventors: Arnaud Georges Nifenecker, Moissy-Cramayel (FR); Jérémi Christophe Benjamin Ador, Moissy-Cramayel (FR); Frédéric Aycaguer, Moissy-Cramayel (FR); Frédéric Jacques Dufau, Moissy-Cramayel (FR); Gilles Gaston Jacques Gouin, Moissy-Cramayel (FR)

(73) Assignees: SAFRAN HELICOPTER ENGINES, Bordes (FR); SAFRAN TRANSMISSION SYSTEMS, Colombes (FR)

( * ) Notice: Subject to any disclaimer, the term of this patent is extended or adjusted under 35 U.S.C. 154(b) by 542 days.

(21) Appl. No.: 18/002,896

(22) PCT Filed: Jun. 11, 2021

(86) PCT No.: PCT/FR2021/051047
§ 371 (c)(1),
(2) Date: Dec. 22, 2022

(87) PCT Pub. No.: WO2021/260287
PCT Pub. Date: Dec. 30, 2021

(65) Prior Publication Data
US 2023/0264267 A1    Aug. 24, 2023

(30) Foreign Application Priority Data

Jun. 25, 2020 (FR) ..................... 2006655

(51) Int. Cl.
*B29C 64/245* (2017.01)
*B22F 10/66* (2021.01)
(Continued)

(52) U.S. Cl.
CPC .............. *B22F 12/37* (2021.01); *B22F 10/66* (2021.01); *B22F 10/68* (2021.01); *B29C 64/245* (2017.08);
(Continued)

(58) Field of Classification Search
None
See application file for complete search history.

(56) References Cited

U.S. PATENT DOCUMENTS

2017/0348905 A1    12/2017    Fey
2018/0326495 A1    11/2018    Dreano
2019/0143589 A1     5/2019    Wang et al.

FOREIGN PATENT DOCUMENTS

CN        107457988 A         12/2017
CN        107617859 A    *     1/2018
(Continued)

OTHER PUBLICATIONS

International Search Report for Application No. PCT/FR2021/051047 dated Sep. 15, 2021.
Written Opinion for PCT/FR2021/051047 dated Sep. 15, 2021.

*Primary Examiner* — Yung-Sheng M Tsui
(74) *Attorney, Agent, or Firm* — McDonald Hopkins LLC

(57) ABSTRACT

A circular modular tray for the additive manufacturing of a part with an axis of revolution on a powder bed, characterised in that it consists of an assembly of modules that are concentrically coupled along a contiguous axis in a radial direction, the modules including an annular peripheral module and a circular central module.

7 Claims, 6 Drawing Sheets

(51) Int. Cl.
  *B22F 10/68* (2021.01)
  *B22F 12/37* (2021.01)
  *B29C 64/35* (2017.01)
  *B33Y 10/00* (2015.01)
  *B33Y 30/00* (2015.01)
  *B33Y 40/20* (2020.01)

(52) U.S. Cl.
  CPC .............. *B29C 64/35* (2017.08); *B33Y 10/00* (2014.12); *B33Y 30/00* (2014.12); *B33Y 40/20* (2020.01)

(56) References Cited

FOREIGN PATENT DOCUMENTS

| | | | | |
|---|---|---|---|---|
| DE | 102017118065 | A1 | 2/2019 | |
| DE | 102018116314 | A1 * | 1/2020 | ............. B33Y 30/00 |
| EP | 3417961 | A1 | 12/2018 | |
| FR | 3030323 | A1 | 6/2016 | |
| JP | 2016203510 | A | 12/2016 | |

* cited by examiner

CIRCULAR MODULAR TRAY FOR THE ADDITIVE MANUFACTURING OF A PART WITH AN AXIS OF REVOLUTION ON A POWDER BED

This is the National Stage of PCT international application PCT/FR2021/051047, filed on Jun. 11, 2021 entitled "CIRCULAR MODULAR TRAY FOR THE ADDITIVE MANUFACTURING OF A PART WITH AN AXIS OF REVOLUTION ON A POWDER BED", which claims the priority of French Patent Application No. 2006655 filed Jun. 25, 2020, both of which are incorporated herein by reference in their entireties.

TECHNICAL FIELD

The present invention relates to the field of additive manufacturing of a part with an axis of revolution on a powder bed, and more particularly to a tray used for the implementation of this manufacturing technique, also called 3D manufacturing.

PRIOR ART

The techniques for manufacturing parts by selective fusion or selective sintering of a material in the form of powder allow to easily create parts having a complex geometry. The material in the form of powder can be metal, ceramic or polymer (for example PEEK). It is specified that in the context of the present application, the term "metallic" includes pure metals and alloys.

These techniques generally consist of methods for selective fusion or selective sintering on a powder bed as described in the document [1], which usually comprise a step during which a first layer of powder of a metal, of a metal alloy, of a ceramic or of a polymer having a controlled thickness is deposited on a manufacturing tray, then a step involving heating with a heating means (for example a laser or a beam of electrons) a predefined zone of the layer of powder, and repeating these steps for each additional layer, until the final part is obtained layer by layer.

The context of the present invention relates to the creation of parts with an axis of revolution.

At present, the manufacturing of parts of revolution by additive manufacturing on a powder bed is carried out on a square or rectangular tray.

The manufacturing method requires a succession of operations, including a separation of the part from the tray by saw cutting, by electrical discharge machining (EDM), etc., before beginning the following machining operations. However, the cutting operation generates delays (placing the tray on the cutting machine, cutting time, cleaning after cutting, etc.). Moreover, when the powder used during the additive manufacturing is a metal powder, this operation is an additional operation further exposing the metal part to risks of corrosion.

DISCLOSURE OF THE INVENTION

The desired goal is the overall optimisation of the manufacturing (fusion/sintering and machining) of parts with an axis of revolution in additive manufacturing on a powder bed (in particular by SLM (for Selective Laser Melting), by EBM (for Electron Beam Melting), by SLS (for Selective Laser Sintering)), in particular pinions, in particular for the creation of parts with large-amplitude stepping of increasing diameters, such as pinions with discs at hub mid-height.

The goal of the invention is in particular to provide a simple and effective solution to the problems raised above.

For this purpose, the invention proposes a circular modular tray for the additive manufacturing on a powder bed of a part with an axis of revolution, characterised in that it is composed of an assembly of modules that are coupled concentrically according to an axis and contiguously according to a radial direction, the modules comprising an annular peripheral module and a circular central module, and wherein, each module including, according to an axial direction, an upper face, intended to be in contact with the powder bed, and a lower face, the lower face of each module is provided with at least one means configured to facilitate a placing of the module on a lathe of a device for machining by turning, said means being chosen from a protrusion (for example of the cone type) or a recess of the notch or groove type.

Here, the modules of the tray fit inside each other concentrically. Preferably, the modules have a circular contour.

According to one alternative, the assembly comprises at least one annular intermediate module located between the annular peripheral module and the circular central module.

Preferably, the assembly of modules forms a flat upper main face.

Preferably, each module is rigidly connected to the adjacent module by a solution to be determined, for example by screwing, or even via radial fitting and an axial stop means allowing to ensure a flatness of the tray thus obtained by the rigid connection of the two modules, compatible with the placing of the layers of powder. Preferably, each module comprises a shoulder, located on a radially outer lateral surface, configured to form an axial stop against a shoulder located on a radially inner lateral surface of an adjacent module.

A solution allowing to simplify their later placing on a machining machine can be judiciously integrated into each of the modules.

The invention also proposes a flat support including, in an upper face, at least one open cavity configured to receive a circular modular tray as described above, the open cavity having a shape complementary to the shape of the circular modular tray. Preferably, the flat support includes several open cavities. This allows to optimise the loading of the additive manufacturing machine.

The invention also proposes a flat assembly for the additive manufacturing on a powder bed of at least one part with an axis of revolution, comprising such a flat support and a modular tray as described above for each of the open cavities of the flat support.

Finally, the invention proposes a method for manufacturing a part with an axis of revolution, comprising:
the creation, by localised fusion or localised sintering of a powder on a modular circular tray as described above, of a blank and of at least one element for supporting this blank, the blank being rigidly connected to the modular circular tray via said at least one support element and the blank having an axis of revolution that coincides with the concentric axis of the modules of the tray;
the depowdering of the blank thus obtained;
if the tray includes one or more modules not rigidly connected to the blank, the removal of these module(s);
the placement of the blank on a lathe of a device for machining by turning;
the machining by turning of a front face of the blank;
the separation of the blank from the rigidly connected module(s) of the tray by cutting by turning, the cutting being carried out at the support element(s) according to a cutting plane perpendicular to the axis of revolution of the blank;

the machining by turning of a rear face of the blank;

the steps of machining and of separation by turning being carried out by rotation of the blank around the concentric axis of the modules of the tray;

whereby the part with an axis of revolution is obtained.

While before it was necessary to separate the blank from the tray by saw cutting or by EDM, before being able to start the operations of machining of the part, the operation of separation of the blank from the tray is now integrated into the operations of machining of the part. Because of the specific shape of the modular tray, the blank coming from the additive manufacturing can be mounted directly on the machining means, which saves an operation during which the blank could be exposed to problems of corrosion.

Preferably, during the step of creating the blank and said at least one support element, a same support element is fused or sintered on a single module.

BRIEF DESCRIPTION OF THE DRAWINGS

The invention will be better understood and other details, features and advantages of the invention will appear upon reading the description given as a non-limiting example in reference to the appended drawings, which illustrate.

DETAILED DISCLOSURE OF SPECIFIC EMBODIMENTS

According to the invention, the additive manufacturing tray is circular and is arranged geometrically in such a way that it can be assembled—after depowdering—on a lathe and thus it is possible to insert the operation of part/tray separation among the operations of blank turning and finishing of the part. More precisely, the tray according to the invention is circular and modular.

Figure 1:
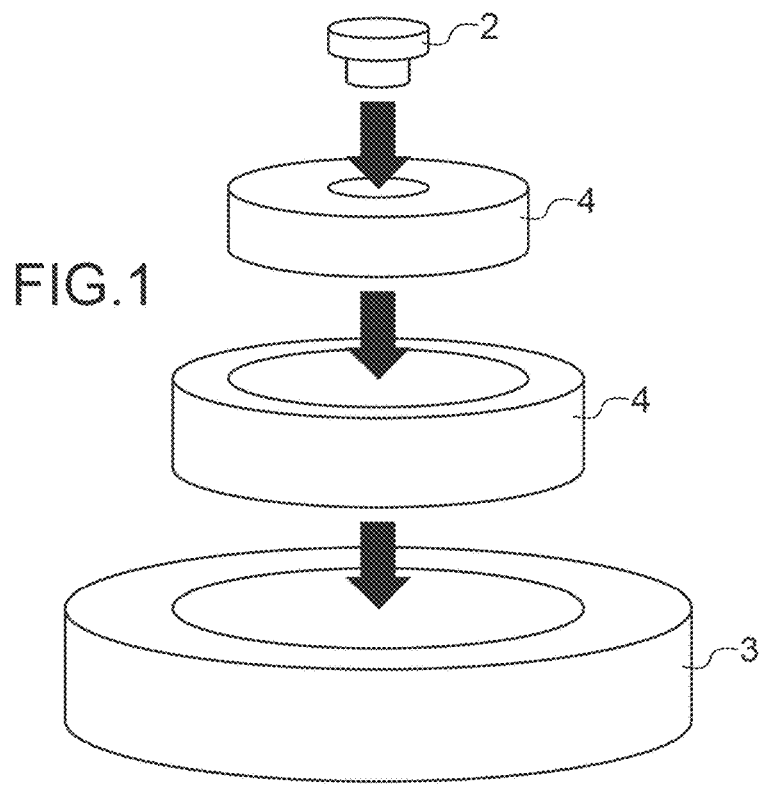
in FIG. 1, an exploded diagram of the modules of a circular modular tray according to an embodiment of the invention.

The tray 1 includes at minimum a central circular module 2 and a peripheral annular module 3. But it can also include one or more intermediate annular modules 4, located between these two modules. Indeed, so as to allow a modularity of the circular tray 1 that is compatible with several reference numbers of parts with an axis of revolution (several outer diameters, several inner hub diameters, etc.), the tray can include n intermediate annular modules 4 (n being an integer greater than or equal to 1), disposed between the central circular tray 2 and the peripheral annular module 3. In FIG. 1, the tray 1 includes two intermediate annular modules 4.

The number of modules, as well as their dimensions, are to be defined case by case by the part manufacturer, in order to best optimise them according to the number of items, while being compatible with the dimensions of the additive manufacturing machine, as well as with the lathe.

Figure 2:
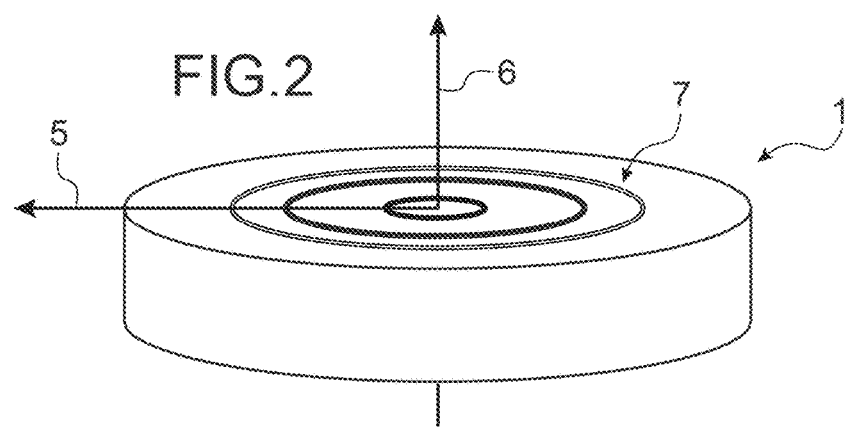
in FIG. 2, a diagram of the circular modular tray obtained by assembly of the modules shown in FIG. 1.

According to FIG. 2, the modules of the tray are coupled in a contiguous manner according to a radial direction 5 of the tray and concentrically to each other (with respect to a concentric axis 6) to form a circular tray 1 having a flat upper main face 7.

The advantage of a modular circular tray, the modules of which fit within each other concentrically is that the support elements necessary for the manufacturing of the part and which are located near the centre of the tray are accessible to a turning tool. For example, the supports necessary for the manufacturing of the inner hub of a pinion are made accessible. Therefore, the part/tray separation can thus occur using this tool according to a cutting plane perpendicular to the turning axis (which corresponds to the concentric axis of the tray).

Figure 3:
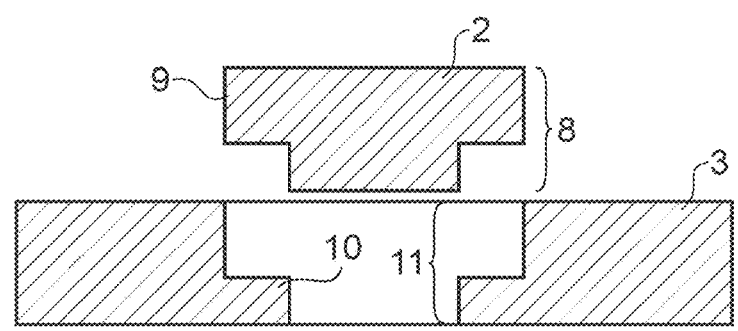
in FIG. 3, an exploded and cross-sectional view of a tray according to an embodiment of the invention.

Preferably, at least one module of the assembly includes, on its radially outer lateral surface 8, a shoulder 9 intended to bear against a shoulder 10 located on the radially inner lateral surface 11 of an adjacent module. FIG. 3 shows the case in which it is the central circular module 2 and the peripheral annular module 3 which include the shoulder 9 and the shoulder 10 respectively on their radially outer 8 and inner 11 lateral surfaces.

According to one embodiment, at least one module includes, on its lower main face 12, at least one recess (for example a notch 13 or a groove 14) configured to facilitate the placing and the retention of the tray/part assembly on the machining lathe.

Figure 4:
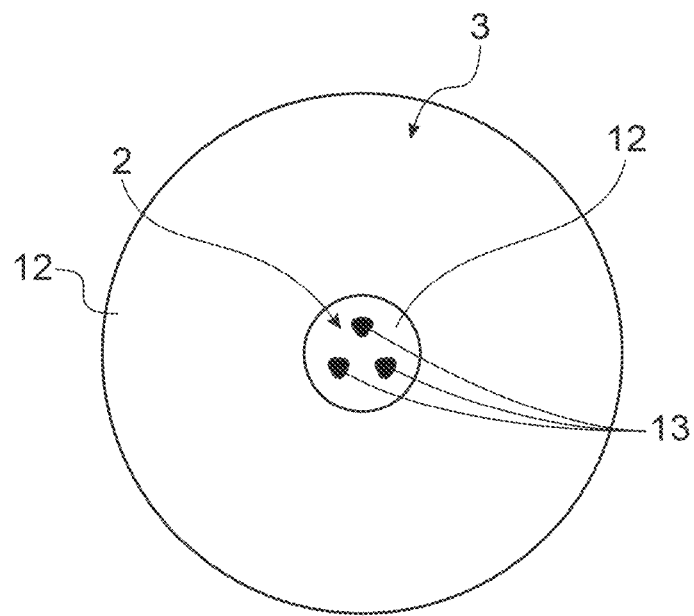
in FIG. 4, a bottom view of a tray according to an embodiment of the invention.
Figure 5:
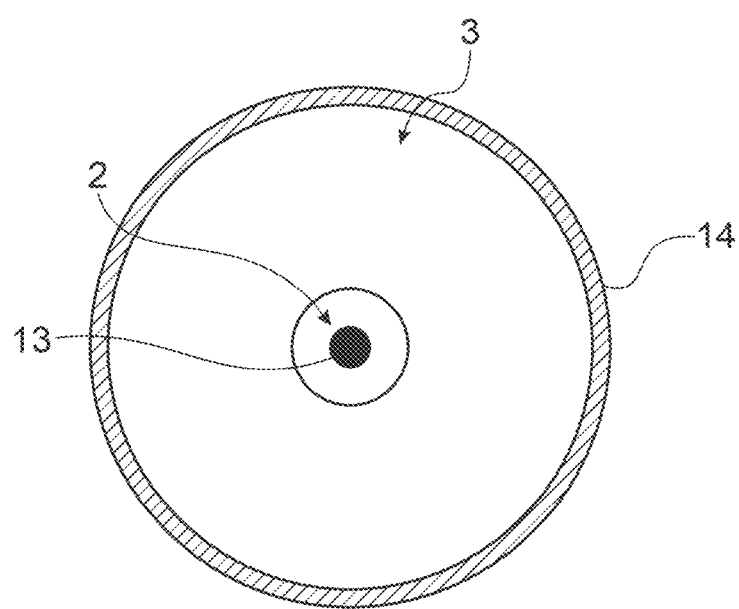
in FIG. 5, a bottom view of a tray according to another embodiment of the invention.

FIG. 4 shows the lower main face of a tray according to the invention, obtained by the assembly of a central circular module 2 and of a peripheral annular module 3. Here, the central circular module 2 includes three notches 13, which are disposed close to the centre of the module. It is specified that, in FIG. 4, said at least one means configured to facilitate a placing of the module on a lathe of a device for machining by turning, chosen from a protrusion or a recess of the notch or groove type, is also present on the peripheral annular module 3, but is not shown. FIG. 5 shows another example in which the central circular module includes a central notch 13 and the peripheral annular module 3 includes a groove 14 located at the periphery of said module. It should be noted that the notches 13 illustrated in FIGS. 4 and 5 could also represent protrusions, for example cones.

Figure 6:
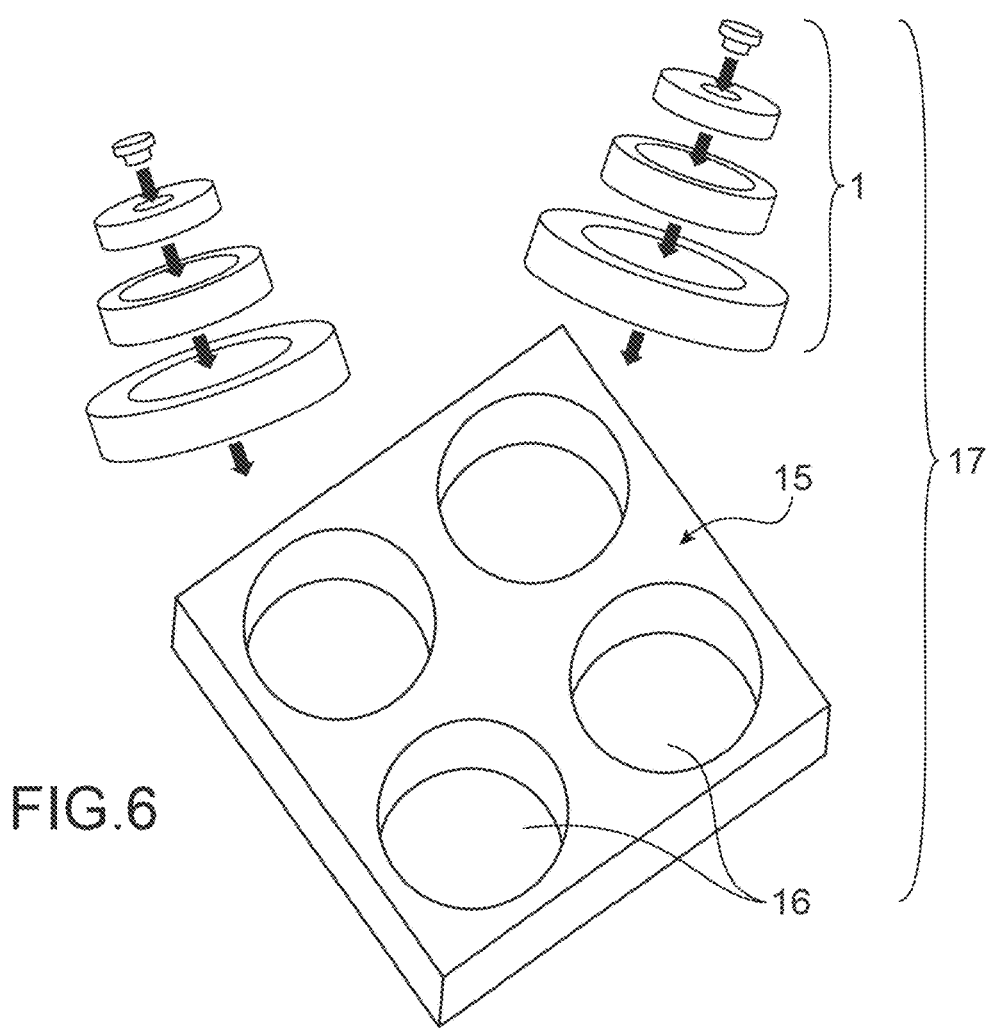
in FIG. 6, a diagram of an embodiment of a flat assembly formed by the assembly of circular modular trays according to the invention in open cavities of a flat support.

FIG. 6 shows a flat support 15 including four open cavities 16, configured to each receive a central circular tray 1, thus forming a flat assembly 17. For simplification purposes, only two modules are shown in FIG. 6.

The manufacturing of a part with an axis of revolution according to the method according to the invention will now be described; the tray used includes two modules here: a central circular module 2 and a peripheral annular module 3.

Figures 7A, 7B:
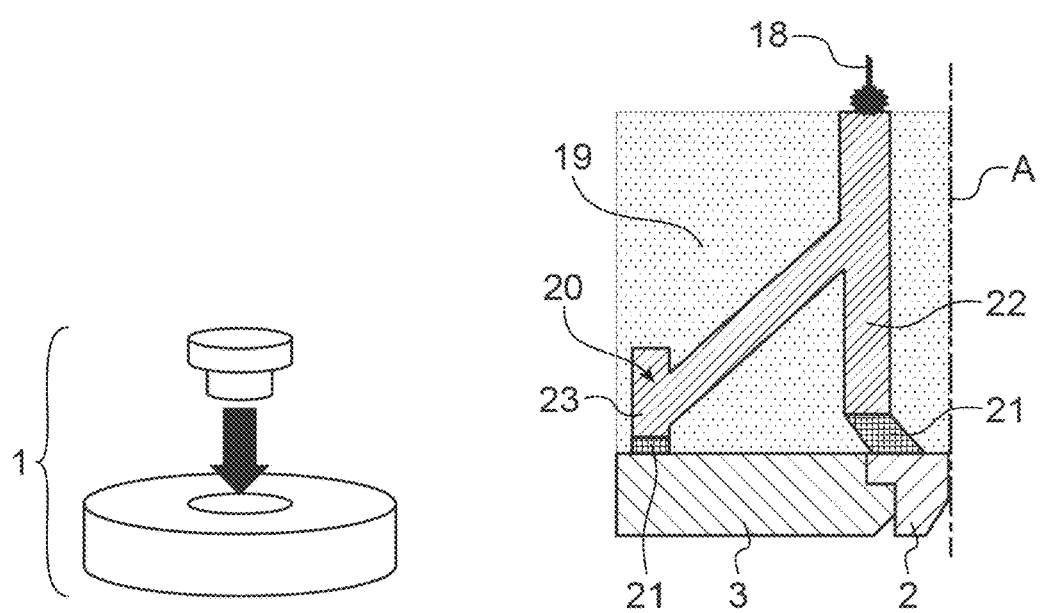
in FIG. 7a, an explanatory diagram of a step of the manufacturing method according to a first embodiment of the invention.
in FIG. 7b, an explanatory diagram of a step of the manufacturing method according to the first embodiment of the invention.

According to a first embodiment, these two modules are assembled to form a circular tray 1 (FIG. 7a) and the tray is placed in a device for additive manufacturing on a powder bed.

The manufacturing of the blank 20 is then carried out by selective fusion or selective sintering of a powder. The powder used can be metal, ceramic or polymer.

The blank 20 is made layer by layer by a conventional additive manufacturing method. Here, for simplification purposes, only half of the image was shown, the other half being symmetrical with respect to the plane of symmetry illustrated by the dotted line A, which also represents the axis of revolution 26 of the part to be made.

In the step of creation of the blank 20 and of the support element(s) 21 on the modular tray 1, the part and the support elements are for example constructed layer by layer by selective fusion or selective sintering of the powder 19 using a laser beam 18, the powder 19 having an average particle size between 10 and 50 µm, or using a beam 18 of electrons, the powder 19 having an average particle size between 50 and 100 µm.

In this exemplary embodiment (FIG. 7b), the part to be made includes in particular an inner hub 22 and a peripheral rim 23, the inner hub 22 being connected to the central circular module 2 via a first support element 21 and the peripheral rim 23 being connected to the peripheral annular module 3 via another support element 21. These two support elements 21 are made, like the part, by selective fusion or selective sintering of the powder. Generally, they are made with holes in order to allow the passage of the powder 19 during the depowdering of the part. They can for example have the shape of lattices. It is noted that each support element 21 is made on a single module, which allows the optional detachment (by separation by cutting) of one module while the other is still rigidly connected to the part.

Figure 7C:
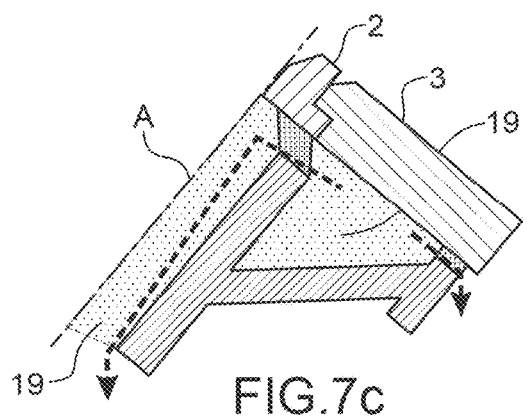
in FIG. 7c, an explanatory diagram of a step of the manufacturing method according to the first embodiment of the invention.

Once the part has been finished, it is depowdered (FIG. 7c). The depowdering can be carried out via suction, blowing, vibration or by turning the blank over in order for the powder to escape via gravity.

Figure 7D:
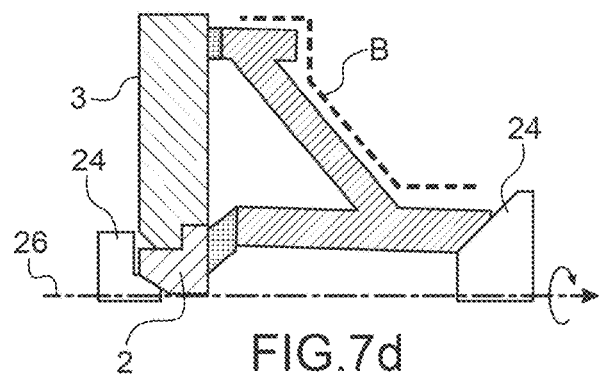
in FIG. 7d, an explanatory diagram of a step of the manufacturing method according to the first embodiment of the invention.

Then, the blank and tray assembly is installed on a lathe and the turning of the front face of the part is carried out (FIG. 7d). The turning is carried out by rotation around the concentric axis of the tray (which corresponds to the axis of revolution 26 of the part). The supports of the part/tray assembly on the lathe are represented by the members 24. The machining of the front face is symbolised by the dotted line B.

Figure 7E:
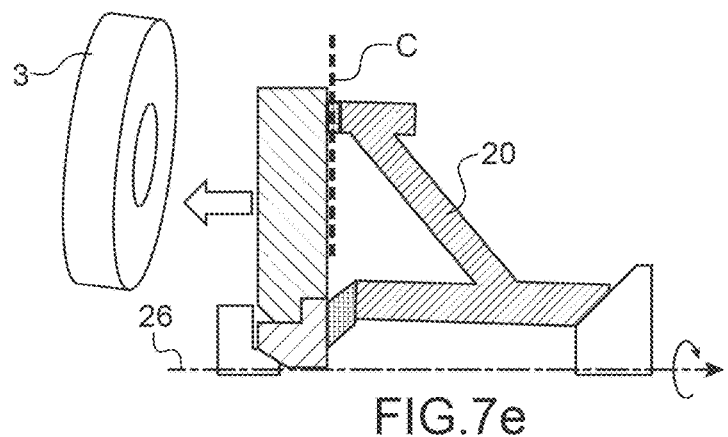
in FIG. 7e, an explanatory diagram of a step of the manufacturing method according to the first embodiment of the invention.
Figure 7F:
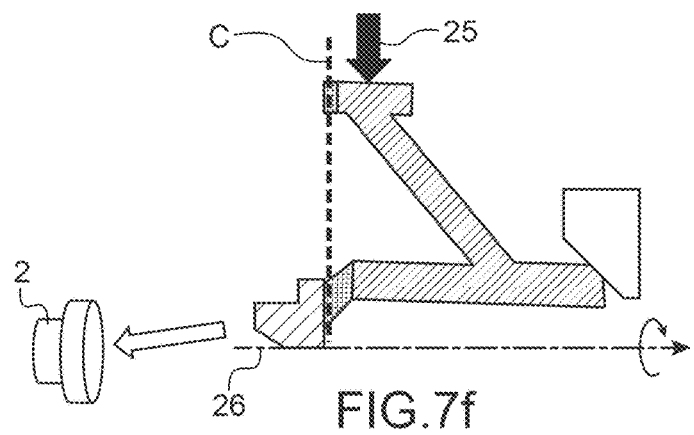
in FIG. 7f, an explanatory diagram of a step of the manufacturing method according to the first embodiment of the invention.

The separation of the part from the peripheral annular tray 1 is then carried out by cutting according to a cutting plane C perpendicular to the axis of revolution of the part (which is also the axis of rotation of the lathe and the concentric axis of the tray) at the support element 21 (FIGS. 7e and 7f). Turning using a tool with a groove can for example be carried out. It should be noted that the modules 2 and 2, once removed, have been shown whole in FIGS. 7e and 7f.

Here, once the peripheral annular module 3 has been removed (FIG. 7e), the support element 21 that connects the part to the central circular module 2 becomes accessible and can in turn be cut off (FIG. 7f).

Figure 7G:
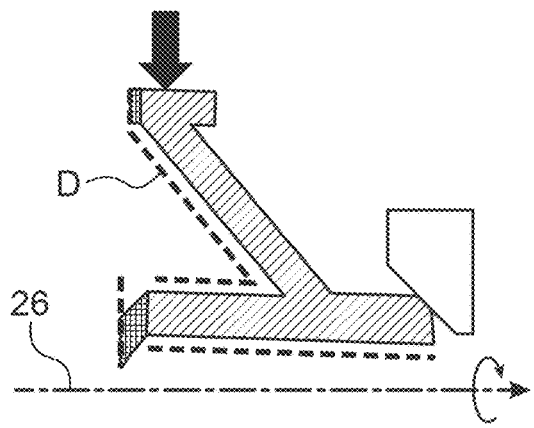
in FIG. 7g, an explanatory diagram of a step of the manufacturing method according to the first embodiment of the invention.

Once the part has been completely separated from the tray, the supports of the part on the lathe are modified in order to free the access to the rear face of the part. A clamping chuck (represented by the arrow 25) can for example be used. The turning of the rear face of the part is then carried out (FIG. 7g), symbolised by the dotted line D.

Front face and rear face of the part are mentioned here, the rear face being the face facing the modular tray.

Another embodiment is illustrated in FIGS. 8a to 8f.

Figure 8A:
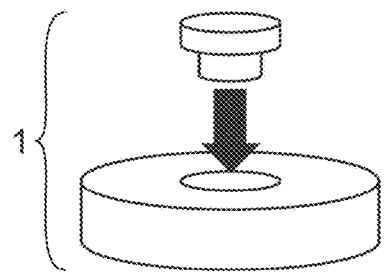
in FIG. 8a, an explanatory diagram of a step of the manufacturing method according to a second embodiment of the invention.
Figure 8B:
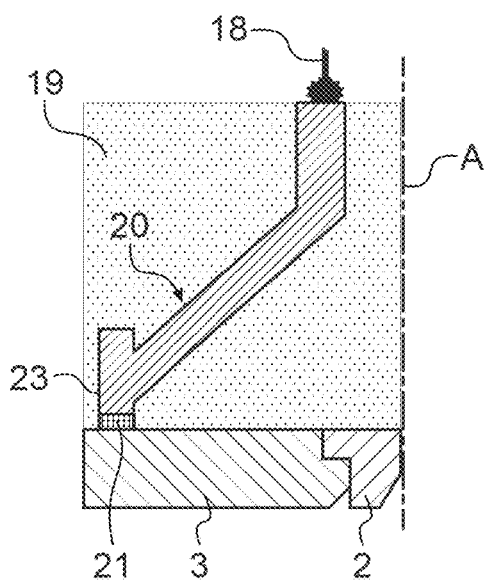
in FIG. 8b, an explanatory diagram of a step of the manufacturing method according to the second embodiment of the invention.

Like in the preceding embodiment, the modules are put in place to form the tray 1 (FIG. 8a) and the latter is placed in a device for additive manufacturing on a powder bed. The part is then made by localised fusion or localised sintering of the powder (FIG. 8b). As can be noted, the part (only half of which is shown) does not include an inner hub. Only the rim 23 is connected to the tray 1 by a support element 21. More precisely, it is the peripheral annular tray 3 that is connected to the part via the support element 21. Here, the function of the central circular module 2 is to propose a flat surface to spread the layer of powder.

Figure 8C:
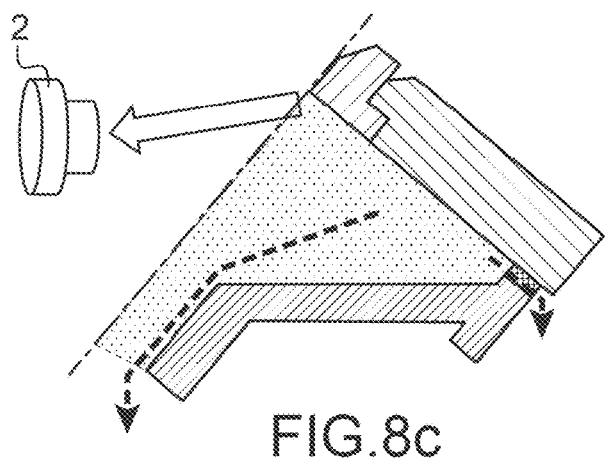
in FIG. 8c, an explanatory diagram of a step of the manufacturing method according to the second embodiment of the invention.

Once the part has been finished, the central circular module 2 (which is not connected to the part) is removed and the depowdering of the part is carried out (FIG. 8c).

Figure 8D:
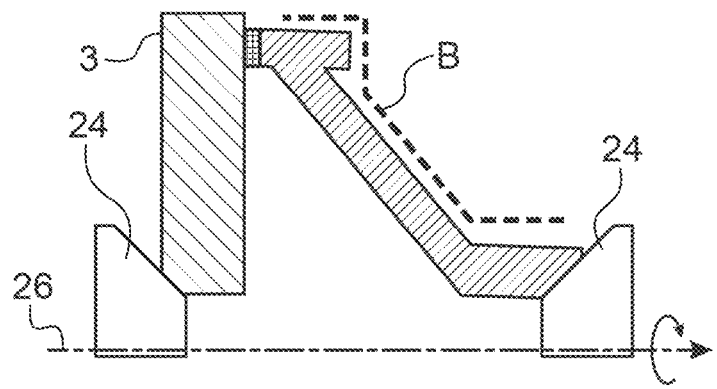
in FIG. 8d, an explanatory diagram of a step of the manufacturing method according to the second embodiment of the invention.

The part/tray assembly (which now only includes the peripheral annular module) is placed on a lathe and the turning of the front face of the part is carried out (FIG. 8d).

Figure 8E:
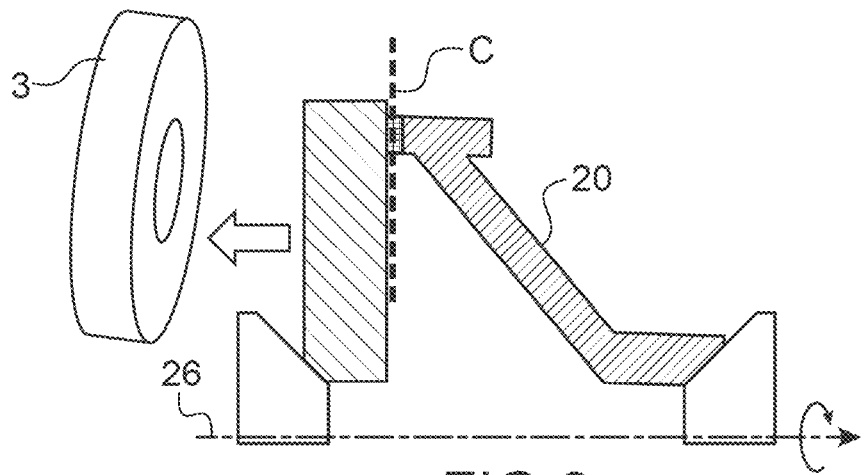
in FIG. 8e, an explanatory diagram of a step of the manufacturing method according to the second embodiment of the invention.

The peripheral annular module is then separated from the part (FIG. 8e).

Figure 8F:
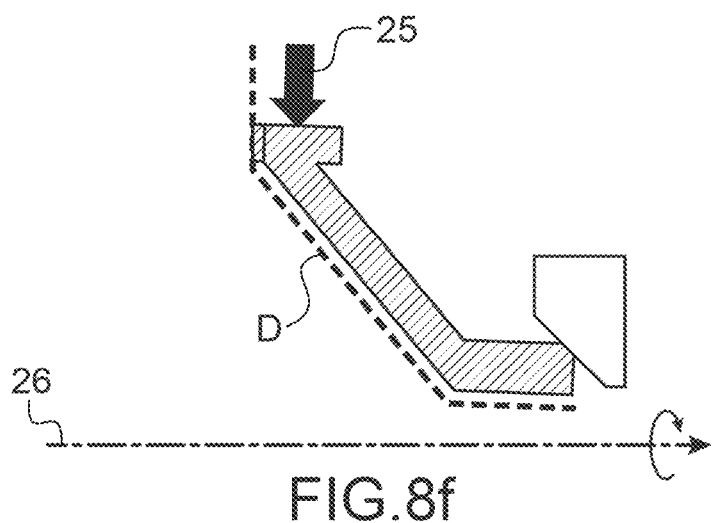
in FIG. 8f, an explanatory diagram of a step of the manufacturing method according to the second embodiment of the invention.

The supports of the part on the lathe are modified and the turning of the rear face of the part is carried out (FIG. 8f).

As can be noted, the support elements 21 in these two embodiments can be removed by conventional machining means using a lathe.

It can also be noted that the modules used for the creation of a part can be reused for the manufacturing of another part, after having applied to them an optional correction operation to obtain a flatness of the assembly capable of receiving the layers of powder.

CITED REFERENCE

[1] FR 3 030 323 A1

What is claimed is:

1. A circular modular tray configured for additive manufacturing on a powder bed of a part with an axis of revolution, wherein the circular modular tray is composed of an assembly of modules that are coupled concentrically according to an axis and contiguously according to a radial direction, the modules comprising a peripheral annular module and a central circular module, and wherein, each module including, according to an axial direction, an upper main face, configured to be in contact with the powder bed, and a lower main face, the lower main face of each module is provided with a protrusion or a recess of notch or groove type configured to facilitate a placing of the module on a lathe of a device for machining by turning.

2. The circular modular tray according to claim 1, wherein the assembly comprises at least one intermediate annular module located between the peripheral annular module and the central circular module.

3. The circular modular tray according to claim 1, wherein the assembly of modules forms a flat upper main face.

4. The circular modular tray according to claim 1, wherein each module comprises a shoulder, located on a radially outer lateral surface, configured to form an axial stop against a shoulder located on a radially inner lateral surface of an adjacent module.

5. A flat assembly configured for additive manufacturing on a powder bed of at least one part with an axis of revolution, comprising the circular modular tray of claim 1 and a flat support including, in an upper face, at least one open cavity configured to receive the circular modular tray for each of the open cavities of the flat support.

6. A method for manufacturing a part with an axis of revolution, comprising:

a creation, by localised fusion or localised sintering of a powder on a circular modular tray according to claim 1, of a blank and of at least one element for supporting the blank, the blank being rigidly connected to the circular modular tray via said at least one support element and the blank having an axis of revolution that coincides with the concentric axis of the modules of the tray;

a depowdering of the blank thus obtained;

if the tray includes one or more modules not rigidly connected to the blank, a removal of these module(s) not rigidly connected to the blank;

a placement of the blank on a lathe of a device for machining by turning;

a machining by turning of a front face (B) of the blank;

a separation of the blank from the rigidly connected module(s) of the tray by cutting by turning, the cutting being carried out at the support element(s) according to a cutting plane (C) perpendicular to the axis of revolution of the blank;

a machining by turning of a rear face (D) of the blank;

the steps of machining (B) (D) and of separation by turning being carried out by rotation of the blank around the concentric axis of the modules of the tray;

whereby the part with an axis of revolution is obtained.

7. The manufacturing method according to claim 6, wherein, during the step of creating the blank and said at least one support element, the support element is fused or sintered on a single module.

* * * * *